May 27, 1969   G. J. BARSTOW   3,447,080
ELECTRICAL TESTING WITH COLOR RESPONSIVE DIGITAL ADDRESS
Filed Oct. 26, 1966

INVENTOR.
GLIDDEN J. BARSTOW
BY
AGENT
ATTORNEYS though capable of including all colors of the rainbow, should be limited to those basic colors and their shades that can easily be differentiated from one another. The chips themselves may be formed in any desired shape but preferably should be formed in a shape that can easily be encompassed by the probe to be described below. The shape of the chip is not limited in any way.

United States Patent Office 3,447,080
Patented May 27, 1969

3,447,080
ELECTRICAL TESTING WITH COLOR RESPONSIVE DIGITAL ADDRESS
Glidden J. Barstow, San Diego, Calif., assignor to the United States of America as represented by the Secretary of the Navy
Filed Oct. 26, 1966, Ser. No. 590,150
Int. Cl. G01r 15/12
U.S. Cl. 324—73      5 Claims

ABSTRACT OF THE DISCLOSURE

The present invention relates to a testing system for measuring an electrical quantity at a plurality of discrete locations and automatically identifying the location of the quantity. Human error in recording the magnitude and location of these quantities is virtually eliminated since the invention is connected to external circuitry for comparison purposes. A plurality of electrical connectors mounted on a test panel is each provided with a disc-shaped chip of colored material, the color of each chip being different than other chips on the panel. The invention, in addition to having a probe adapted to mate with each of the electrical connectors, contains a hooded light source and photo-cells sensitive to a particular color due to appropriate light filtering. Placing the probe in electrical contact with an electrical connector on the test board also causes the photo-cells to give a composite signal, the composition and magnitude of which is dependent on the hue and intensity of the light reflected from the colored chips. This composite signal, passed from the photo-cells, to an analog-to-digital converter, and to a computer, permits rapid identification of the particular test location. Because each disc is slightly different colored than the others a different composite signal indicative of an electrical connector's location will be produced. Thus, the invention frees a technician from the responsibility of recording each electrical connector output and its location to eliminate human error in the testing process.

---

The invention described herein may be manufactured and used by or for the Government of the United States of America for governmental purposes without the payment of any royalties thereon or therefor.

This invention relates to a semi-automatic electrical measuring system and more particularly to a measuring system which automatically indicates the location or address of a point being measured by means of spectrographic analysis.

In the maintenance and calibration of large electronic systems it is often times necessary to measure voltages or other quantities at a number of test points to insure that the system is functioning properly. The most elementary form of making such measurements involves the use of a human operator and a suitable meter with the operator going from point to point in the system, measuring each of the quantities desired, and comparing the meter readings of those quantities with the desired versions of same. Obviously, such a method is subject to numerous errors and in particular errors of human judgment in reading the meter, etc. A more sophisticated technique for performing the same measuring operation involves a human operator and automatic measuring apparatus including some form of a computer. With such a technique the quantity of the measurement is automatically determined and compared with a desired quantity stored in the computer. With such an automated technique the potential error in reading a meter is eliminated however a significant potential source of error remains. The latter mentioned source of error is inherent in the process by which the operator must move a measuring probe from point to point throughout the system as he performs the measuring operation. For the measurements, or data, to be of any value, the computer or other automatic measuring equipment must be informed of the particular point or location which is being measured at a particular time. In such a system, the human operator is relied on to supply this additional required information to the measuring equipment. The operator therefore must note the particular location or test point he is measuring and send some sort of signal indicative of same to the automated part of the system. The latter function would most likely be performed by equipping the operator with some form of a signal generator capable of generating a particular descrete signal for each particular test point to be measured. His measuring operation would therefore involve placing a probe on the particular test point to be measured and then actuating the generator in such a manner as to cause it to generate a signal indicative of the location of the particular test point. The error in such an operation is readily apparent, to wit, the operator must perform the test point identification function. What this invention contemplates is the elimination of the latter noted source of error in semi-automatic measuring systems.

An object of this invention, therefore, is to minimize potential human error in a semi-automatic electrical measuring system.

A more particular object of this invention is to provide a means for automatically indicating the location of a test point being measured by a semi-automatic measuring system.

A further object of this invention is to provide apparatus which automatically identifies the location of a test point in a system by means of spectographic analysis.

A yet further object of this invention is to provide a simple spectographic apparatus for use in identifying check point locations in an electrical system being measured.

In accordance with this invention, and in a preferred embodiment thereof, an electrical testing system for measuring an electrical quantity in a plurality of locations is provided with means for automatically identifying the particular location being measured. At each of the plurality of locations to be measured, an electrical connector and a chip of colored material is mounted. The chip mounted at a particular connector has a color which is a different combination of shades of basic colors than the chips associated with the other connectors in the system. A probe is then provided which is adapted to mate with each of the connectors. The probe contains an element adapted to make electrical contact with the connectors and also includes means for analyzing and detecting the particular combination of shades of colors of each of the color chips associated with each of the connectors and producing an electrical signal indicative of such color. The electrical signal at the connector and also the signal produced by the color detecting means are then transferred to a central monitoring device which is therefore provided with a first signal indicative of the location of a second signal and a second signal indicative of the measurement of an electrical quantity at said location.

The above and other features and objects of the present invention will be more apparent and better understood from the ensuing detailed description and attached drawings wherein.

Figure 1:
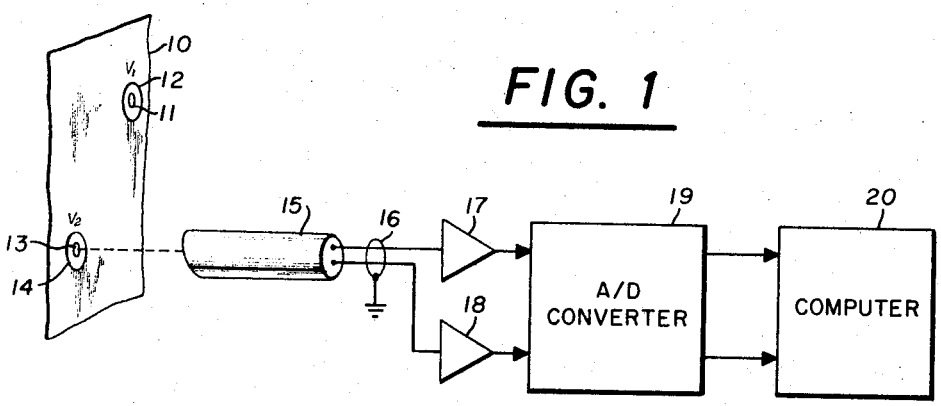
FIG. 1 is a block diagram illustrating a typical embodiment of the present invention.

Referring now to the diagram of FIG. 1, the general scheme of the invention will become apparent in FIG. 1, numeral 10 designates a section of a panel located on some piece of electronic equipment which is to be tested. On panel 10 two test points, designated by V1 and V2, respectively, have been shown. It should be noted that in the actual practice of this invention more than two test points would, of course, be involved but for purposes of simplification the use of two points as being exemplary is sufficient. Each test point comprises an electrical connector and the chip of colored material surrounding the particular connector. Consequently at test point V1 numeral 11 designates an electrical connection while numeral 12 refers to a circular piece of chip of colored material disposed about the electrical connection 11. Similarly, at point V2 an electrical connection 13 and a color chip 14 are shown. It should be apparent therefore that regardless of how many test points are located on the equipment to be measured, each such point will have an electrical connector and a color chip associated therewith. The particular composite make-up of basic colors of each of the chips used must be different than those of all other chips of the equipment so that a particular chip is indicative of a discrete location or address.

Numeral 15 designates a probe adapted to be attached to each of the test points in the equipment. Probe 15 is of such a size that it may be hand-held by an operator and moved from point to point on the equipment being measured. Contained within the probe 15 is an element for electrically mating with the electrical connector at each test point and means for analyzing and detecting the particular composite make-up of basic colors of the chips associated with each test point. The latter means will be described in detail at a later time. It is sufficient to note at this time that two signals will be available at probe 15, a first representing a voltage or other electrical measurement taken from some test point and a second being an electrical signal commensurate with the results of a color analysis of a test point color chip.

The two noted signals are supplied over a shielded cable 16 to amplifier 17 and 18, respectively, wherein their magnitudes are increased to levels sufficient for driving an analog-to-digital converter 19. Converter 19 will therefore receive two signals, one indicative of the electrical measurement at a test point and the other indicative of the color and consequently the location of a test point. After conversion to digital quantities the two signals are presented to a computer 20 for processing. The particular details of computer 20 are not necessary for an understanding of the instant invention nor do they form a part thereof. It is sufficient to say that computer 20 functions to compare test point measurements with desired values for same and to produce some sort of an indication when coincidence between actual and desired values is not present. The location or address signal supplied to the computer functions to retrieve the desired value applicable to a certain test point so that a comparison may be made.

Figure 2:
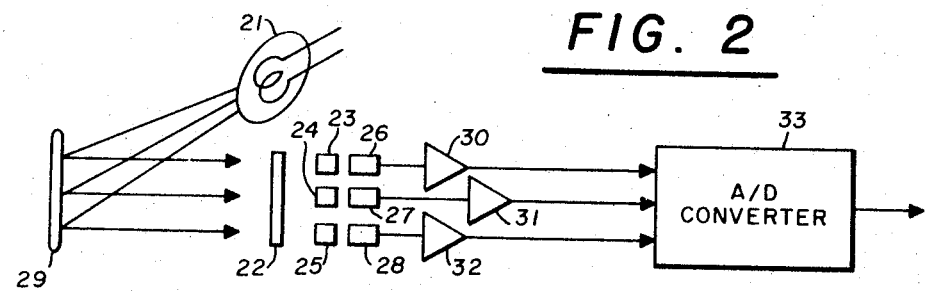
FIG. 2 is a diagram of the spectrographic apparatus suitable for use with the embodiment of FIG. 1.

Referring now to FIG. 2, the operation of the color analyzing portion of probe 15 will be explained. Within the probe, is contained a source of light 21, an infrared filter 22, red, blue and green filters, 23 through 25, respectively, and three photocells 26 through 28. Each combination of a color filter and a photocell represents a detector for one of the primary colors, red, blue or green. Since a channel is provided for each of the primary colors, chip colors may be determined by measuring their respective components of the primary colors. In operation, light from source 21 is reflected by color chip 29 to the detection elements within the probe. The reflected light passes through infrared filter 22 and to each of the respective primary color channels. Filter 23 passes only light within the red portion of the color spectrum. By coaxially arranging photo cell 26 behind the red filter 23, the cell 26 will produce an electrical signal indicative of the magnitude of the red component of light reflected from color chip 29. Blue filter 24 and green filter 25 with their respective photo cells 27 and 28 similarly provide electrical signals indicative of the magnitude of the blue and green components, respectively, in the reflected light. Amplifiers 30, 31 and 32 are connected to the outputs of photo cells 26 through 28, respectively, for increasing the relatively low level photo cell output signals to sufficient levels for driving later equipment. The amplifier outputs are supplied to converter 33 for conversion into digital signals commensurate with the analog levels from the amplifiers. Converter 33 is in essence the same as that indicated by the numeral 19 in FIG. 1, or at least a part thereof.

In one model constructed, filters 23 through 25 were standard Corning glass filters, the red filter 23 being Corning-type 2–62, blue filter 24 being Corning-type 5–58 and green filter 25 being Corning-type 4–64. The infrared filter 22 similarly was a standard Corning-type 1–69. It should be understood that infrared filter 22 would not be necessary in all applications but is merely used to minimize the response which the particular red, blue and green filters have to the infrared portion of the color spectrum. In the model made, the photo cells used were Clairex-type 905HL. It should be understood, of course, that the particular types of filter and photo cells are merely exemplary and the invention is not limited thereto.

Figures 3, 4:
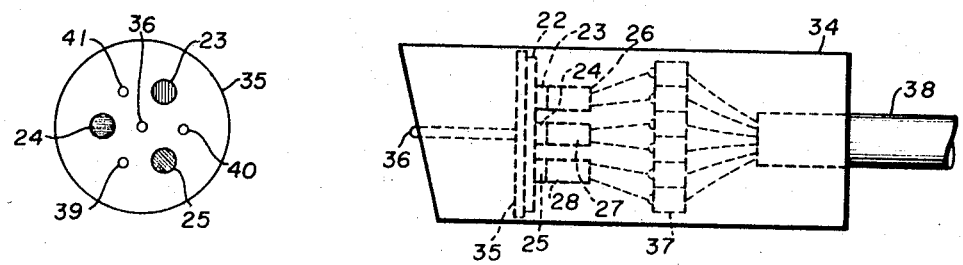
FIG. 3 illustrates a side view of a typical measuring probe for use in the present invention.
FIG. 4 is an end view of the probe of FIG. 3.

The constructional details of a probe for use with this invention are shown in FIGS. 3 and 4. In the latter figures the same numerals have been used to designate components identical to those described with relation to FIG. 2. The various components of the probe are housed within a hollow cylindrical tube 34. A mounting disc or plate 35 is recessed from one end of the tube and provides a suitable mounting structure for the various filters, photo cells and electrical connecting element 36. The exact constructional details of how the various filters and other components are mounted within the probe have not been shown since a multitude of different arrangements is possible. FIG. 3 does show the basic spatial relationships which the various components occupy within the probe. The outputs of photo cells 26 through 28 are connected to some form of terminal strip generally designated as 37 and then to cable 38 which connects the probe with the remaining equipment in the system.

The chamber formed between the end of tube 34 and mounting plate 35 provides a distance wherein light from the source may be directed to the color chip and back to the detectors. For optimal operation this distance should be sufficient to permit the angle between the light sources and the color detectors to be very small. If the distance is too great however the magnitude of reflected light may be insufficient to permit proper resolution by the color detectors. Consequently a compromise distance must be chosen depending on the sensitivity of the detectors, the brightness of the lamps and other parameters involved in a particular probe.

The color detectors, each comprising a filter and a photocell are symmetrically arranged radially about the center electrical connector 36 as can best be seen in FIG. 4. The light source in the same figure comprises miniature light bulbs mounted between the respective color detectors at points 39, 40 and 41. Such an arrangement of the light sources provides a uniform illumination of the color chip being examined with a uniform resultant reflection of light back to the detecting devices. It is important that the sources of light used be mounted behind the effective surfaces of the various detectors so that no incident light from the sources will impinge on the detectors. The light sources have not been shown on the side view of FIG. 3 for purposes of simplification. Similarly, an electrical connection between the electrical connecter element 36 and the output cable 38 has not been shown although it should be understood that provisions for same would be included in an actual operating embodiment.

As can be noted from FIG. 3, the end of the tube 34 is formed with its end at an angle to prevent a perpendicular connection between the probe and an electrical connector when measurements are being made. This arrangement orients the probe to provide a better reflection condition and to minimize direct glare from the chip to the photo-cells. An angle of 10° from perpendicular was found to work satisfactorily.

The possibility of discrete addresses available with a system such as that of the present invention is, of course, limited by the number of different discrete colors of reflectors which are available. This number would appear to be an indefinite one although with practical considerations in obtaining the color material a number on the order of 100 would seem realistic. On the model which was constructed, the color material was Scotchlight produced by the Minnesota Mining and Manufacturing Company. The latter material is available in sixty-four different colors. Of course the number of addresses available is also limited by the resolution of the particular color detector arrangement which is used. With regard to the later point, the present system could be improved by substituting a dichroic filter type color detector for the colored glass filters described. The dichroic arrangement would result in a higher cost instrument, however in certain applications increased cost might be justified by other considerations.

It is therefore apparent that this invention provides a unique way of supplementing an electrical signal measured at some test point with another signal indicative of the location of such test point.

Obviously many modifications and variations of the present invention are possible in the light of the above teachings. It is therefore to be understood that within the scope of the appended claims the invention may be practiced otherwise than as specifically described.

What is claimed is:

1. An electrical testing system for measuring an electrical quantity at a plurality of locations and automatically identifying the particular location measured comprising:
   a plurality of electrical connectors, each being disposed at a respective one of said plurality of locations,
   a chip of colored material mounted at each of said connectors,
   each chip associated with each of said connectors having a color which is different than that of other chips at other connectors,
   a probe adapted to mate with each of said connectors,
   said probe containing an element adapted to make electrical contact with said connectors and means for analyzing and detecting the particular color of each of said chips and producing an electrical signal indicative of said color,
   means for transferring any signal present at said electrical connectors and respective signals indicative of said colors to a central monitoring device whereby said device is provded wth a first measurement of an electrical quantity at some location and a second measurement indicative of the location of said first measurement.

2. The apparatus of claim 1 wherein said monitoring device comprises a computer adapted to analyze the measurements from said probe and compare same with desired measurements.

3. The apparatus of claim 1 wherein said means for analyzing and detecting the particular color of said chips comprises:
   a source of light for illuminating a chip being analyzed,
   means for measuring the magnitude of the primary colors of the light reflected from said chip,
   said means for measuring comprising:
      three light responsive photocells, each being responsive to color frequencies within a different band from the others with the first being responsive to primarily red, the second to blue and the third to green.

4. The apparatus of claim 3 wherein each photocell is made responsive to a particular color band by providing each with a light filter adapted to pass only frequencies within the respective bands.

5. The apparatus of claim 4 wherein said probe comprises:
   a hollow cylindrical tube adapted to be held by an operator,
   said element adapted to make electrical contact with said connector being mounted along the central axis of said tube,
   said photocells being mounted in a symmetrical radial arrangement about said central axis and within said tube,
   said source of light also being contained within said tube.

References Cited

UNITED STATES PATENTS

| | | | |
|---|---|---|---|
| 2,775,710 | 12/1956 | Ludeman | 250—83.6 |
| 2,882,786 | 4/1959 | Kaye | 250—226 |
| 3,003,388 | 10/1961 | Hunter et al. | 250—226 |
| 3,143,648 | 8/1964 | Bradley et al. | 250—83.6 |
| 3,334,236 | 8/1967 | Bacon | 250—217 |

JAMES W. LAWRENCE, *Primary Examiner.*

D. O'REILLY, *Assistant Examiner.*

U.S. Cl. X.R.

250—226; 324—72.5